US012452973B2

(12) United States Patent
Lim

(10) Patent No.: US 12,452,973 B2
(45) Date of Patent: Oct. 21, 2025

(54) DISPLAY DEVICE

(71) Applicant: LG ELECTRONICS INC., Seoul (KR)

(72) Inventor: Kyoungryul Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/281,482

(22) PCT Filed: May 4, 2022

(86) PCT No.: PCT/KR2022/006440
§ 371 (c)(1),
(2) Date: Sep. 11, 2023

(87) PCT Pub. No.: WO2022/250321
PCT Pub. Date: Dec. 1, 2022

(65) Prior Publication Data
US 2024/0172344 A1 May 23, 2024

(30) Foreign Application Priority Data
May 24, 2021 (KR) ........................ 10-2021-0066520

(51) Int. Cl.
*H05B 45/325* (2020.01)
*G08B 5/36* (2006.01)
(Continued)

(52) U.S. Cl.
CPC ..... *H05B 45/325* (2020.01); *H04N 21/42203* (2013.01); *H05B 45/20* (2020.01); *G08B 5/36* (2013.01)

(58) Field of Classification Search
CPC ...... H05B 45/325; H05B 45/20; H05B 47/12; H04N 21/42203; G08B 5/36; G09G 5/001; G09G 3/3413; G10L 25/48
See application file for complete search history.

(56) References Cited

U.S. PATENT DOCUMENTS

2007/0159421 A1* 7/2007 Peker ................. H05B 45/3725 345/82
2008/0284714 A1* 11/2008 Wu ...................... G09G 3/3413 345/102
(Continued)

FOREIGN PATENT DOCUMENTS

CN 108632652 10/2018
DE 102014100905 B3 * 6/2015 ............... G09G 5/10
(Continued)

OTHER PUBLICATIONS

PCT International Application No. PCT/KR2022/006440, International Search Report dated Aug. 26, 2022, 4 pages.
(Continued)

*Primary Examiner* — Michael Lee
(74) *Attorney, Agent, or Firm* — LEE, HONG, DEGERMAN, KANG & WAIMEY

(57) ABSTRACT

The present disclosure provides a display device comprising: a lighting unit including a plurality of LED modules; a pulse width modulation signal generator configured to output an alternating-current signal for controlling on or off of each of the plurality of LED modules; an RC filter configured to convert the alternating-current signal into a rectification signal; an LED circuit configured to turn on or off each of the plurality of LED modules according to a voltage intensity of the rectification signal; and a processor configured to adjust the duty ratio of the alternating-current signal output from the pulse width modulation signal generator on the basis of the operation state information of the display device to control on or off of each of the plurality of LED modules.

14 Claims, 8 Drawing Sheets

(51) Int. Cl.
*H04N 21/422* (2011.01)
*H05B 45/20* (2020.01)

(56) References Cited

U.S. PATENT DOCUMENTS

| | | | | |
|---|---|---|---|---|
| 2010/0045579 | A1* | 2/2010 | Lu | G09G 3/3426 345/83 |
| 2012/0274877 | A1* | 11/2012 | Sasaki | H05B 45/3725 315/186 |
| 2013/0234619 | A1 | 9/2013 | Sempel | |
| 2014/0159607 | A1 | 6/2014 | Fujishiro | |
| 2014/0218657 | A1* | 8/2014 | Haruta | G09G 3/3426 349/61 |
| 2016/0143103 | A1* | 5/2016 | Kang | H05B 47/175 315/210 |
| 2016/0183340 | A1 | 6/2016 | Lee et al. | |
| 2016/0293115 | A1* | 10/2016 | Yamashita | G09G 3/3406 |
| 2017/0339756 | A1* | 11/2017 | Ahn | H05B 47/28 |
| 2021/0151044 | A1 | 5/2021 | Yoshida | |

FOREIGN PATENT DOCUMENTS

| | | |
|---|---|---|
| JP | 2013037763 | 2/2013 |
| JP | 5185468 | 4/2013 |
| KR | 10-1999-0080820 | 11/1999 |
| KR | 10-0922617 | 10/2009 |
| KR | 10-2016-0014757 | 2/2016 |

OTHER PUBLICATIONS

European Patent Office Application Serial No. 22811514.3, Search Report dated May 16, 2025, 14 pages.

* cited by examiner

DISPLAY DEVICE

CROSS-REFERENCE TO RELATED APPLICATIONS

This application is the National Stage filing under 35 U.S.C. 371 of International Application No. PCT/KR2022/006440, filed on May 4, 2022, which claims the benefit of earlier filing date and right of priority to Korean Application No. 10-2021-0066520, filed on May 24, 2021, the contents of which are all hereby incorporated by reference herein their entirety.

TECHNICAL FIELD

The present invention relates to a display device, and more particularly, to a display device that allows LEDs of various colors to emit light according to an operation state of the display device.

BACKGROUND ART

A display device is a device having a function of receiving, processing, and displaying an image which a user is able to watch. The display device receives, for example, a broadcast signal selected by the user among broadcast signals transmitted from a broadcasting station, separates an image signal from the received signal, and displays the separated image signal on a display.

Recently, with the development of broadcasting technology and network technology, the functions of the display device have been diversified, and the performance of the display device has been improved accordingly. That is, the display device has been developed to provide not only broadcast content, but also various other content to users.

For example, the display device may provide not only programs received from broadcasting stations, but also game play, music listening, Internet shopping, user customized information, and the like using various applications. In order to perform such extended functions, the display device is basically connected to other devices or networks using various communication protocols to provide a user with ubiquitous computing environment. That is, the display device has evolved into a smart device that enables connectivity to a network and ubiquitous computing.

Meanwhile, a user interface or device capable of intuitively displaying the current operation state of a display device to the user is required as diverse functions are provided to the display device.

For example, when a voice recognition function is performed by various service providers in a display device, a user interface or device capable of identifying a service provider that is currently providing voice recognition in the display device is required.

Meanwhile, it is necessary to minimize cost increase in providing the user interface or device for identifying a voice recognition service provider operating in a display device.

DISCLOSURE OF INVENTION

Technical Problem

An object of the present disclosure is to provide a display device that allows LEDs of various colors to emit light according to an operation state of the display device.

An object of the present disclosure is to provide a display device including an LED circuit for displaying an operation state of a voice recognition mode in the display device and a display device for controlling operation of LEDs.

Further, an object of the present disclosure is to provide a display device that outputs LEDs of various colors to identify a service provider of a voice recognition service in operation when a plurality of service providers provide the voice recognition service in the display device.

Further, an object of the present disclosure is to provide a display device including an LED circuit structure capable of minimizing a cost increase that may occur when an LED module for each color is added in the display device.

Technical Solution

According to an embodiment of the present disclosure, a display device includes a lighting unit including a plurality of LED modules, a pulse width modulation signal generator configured to output an alternating-current signal for controlling on or off of each of the plurality of LED modules, an RC filter configured to convert the alternating-current signal into a rectification signal, an LED circuit configured to turn on or off each of the plurality of LED modules according to a voltage intensity of the rectification signal, and a processor configured to adjust a duty ratio of the alternating-current signal output from the pulse width modulation signal generator on the basis of operation state information of the display device to control on or off of each of the plurality of LED modules.

Advantageous Effects

According to the embodiment of the present disclosure, a user can intuitively grasp the operation state of the display device by allowing LEDs of various colors to emit light according to the operation state of the display device.

According to the embodiment of the present disclosure, when a plurality of service providers provides a voice recognition service, it is possible for a user to identify a service provider of a voice recognition service in operation by outputting LEDs of various colors for identifying the service provider of the voice recognition service in operation when a plurality of service providers provides voice recognition services in the display device.

According to the embodiment of the present disclosure, it is possible to provide an LED circuit structure capable of minimizing a cost increase that may occur when an LED module for each color is added to a display device.

According to an embodiment of the present disclosure, it is possible to provide an LED module to implement various colors without increasing the number of pins using a pulse width modulation signal generator, thereby simplifying the circuit configuration and minimizing manufacturing costs.

BEST MODE FOR CARRYING OUT THE INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
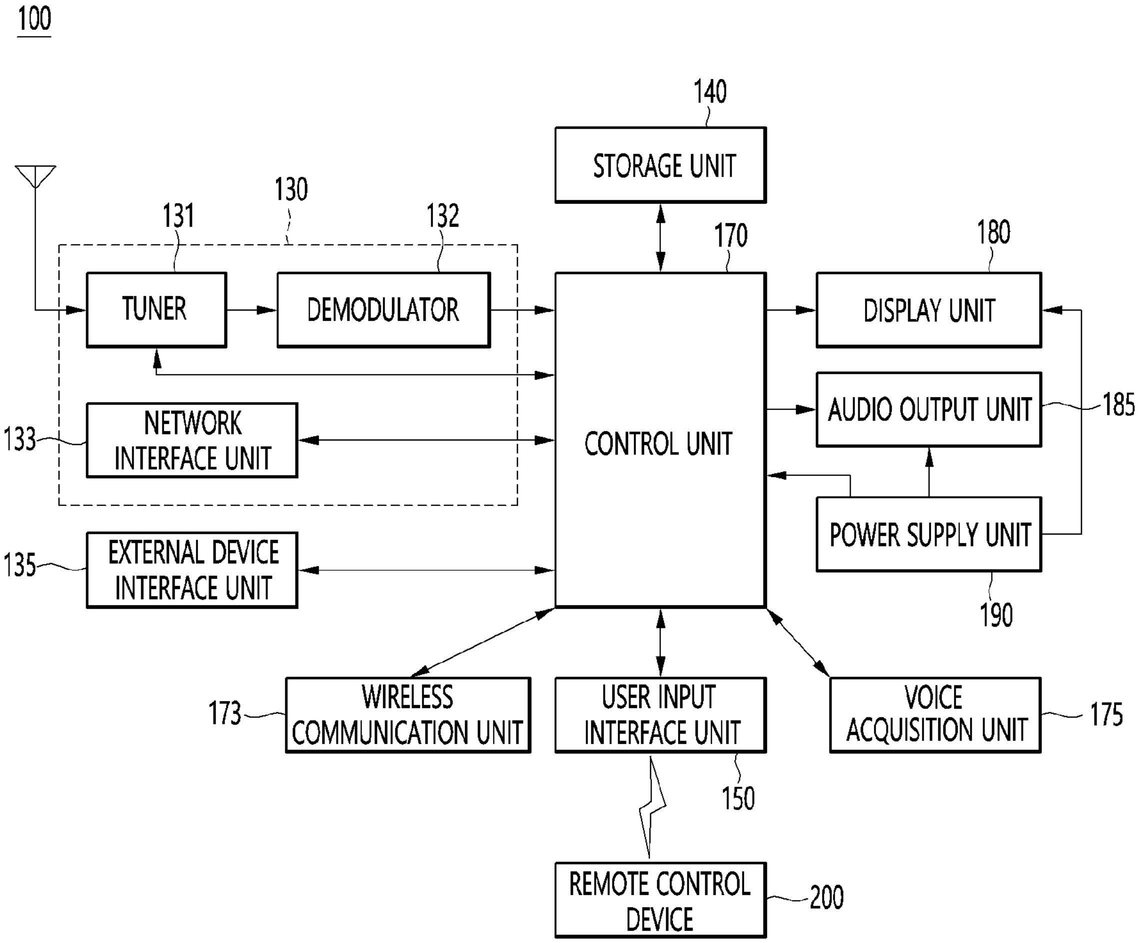
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
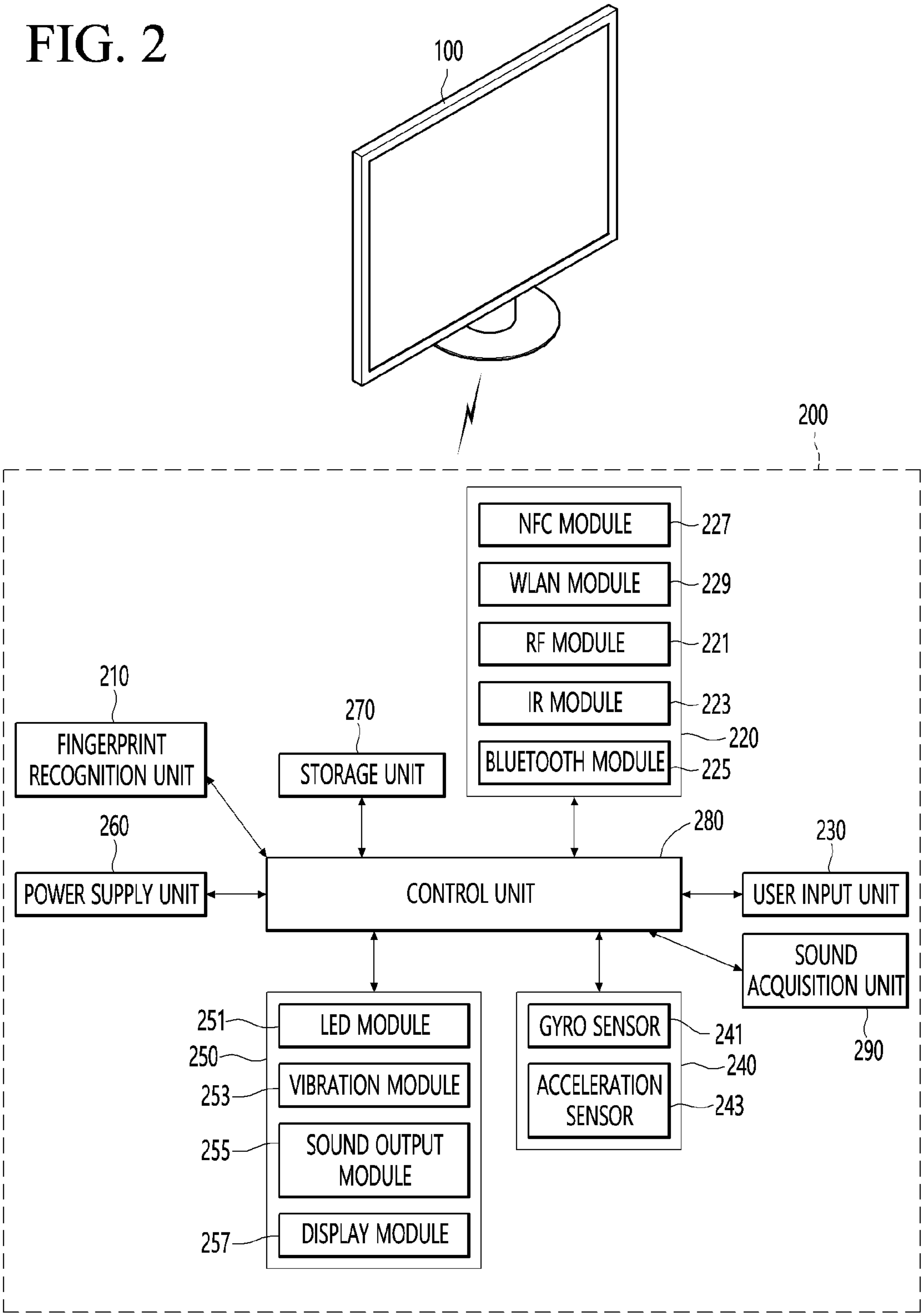
FIG. 2 is a block diagram illustrating a remote control device according to an embodiment of the present disclosure
Figure 3:
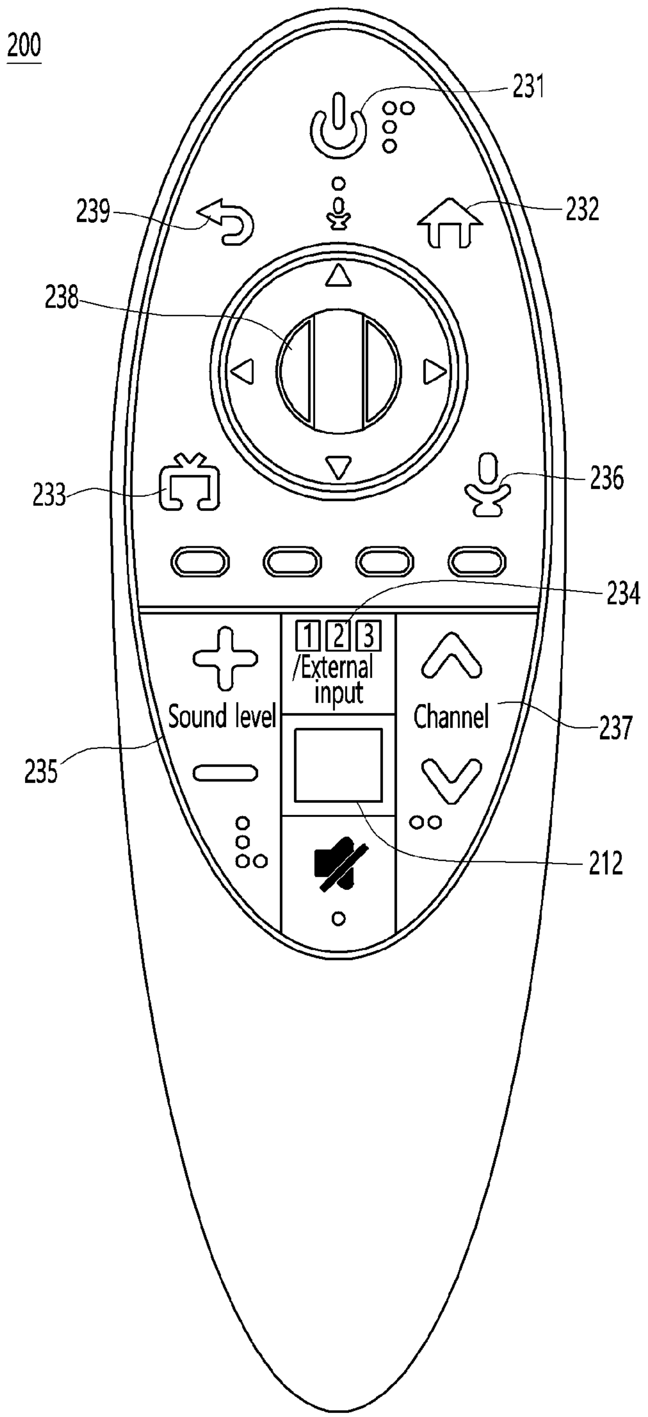
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
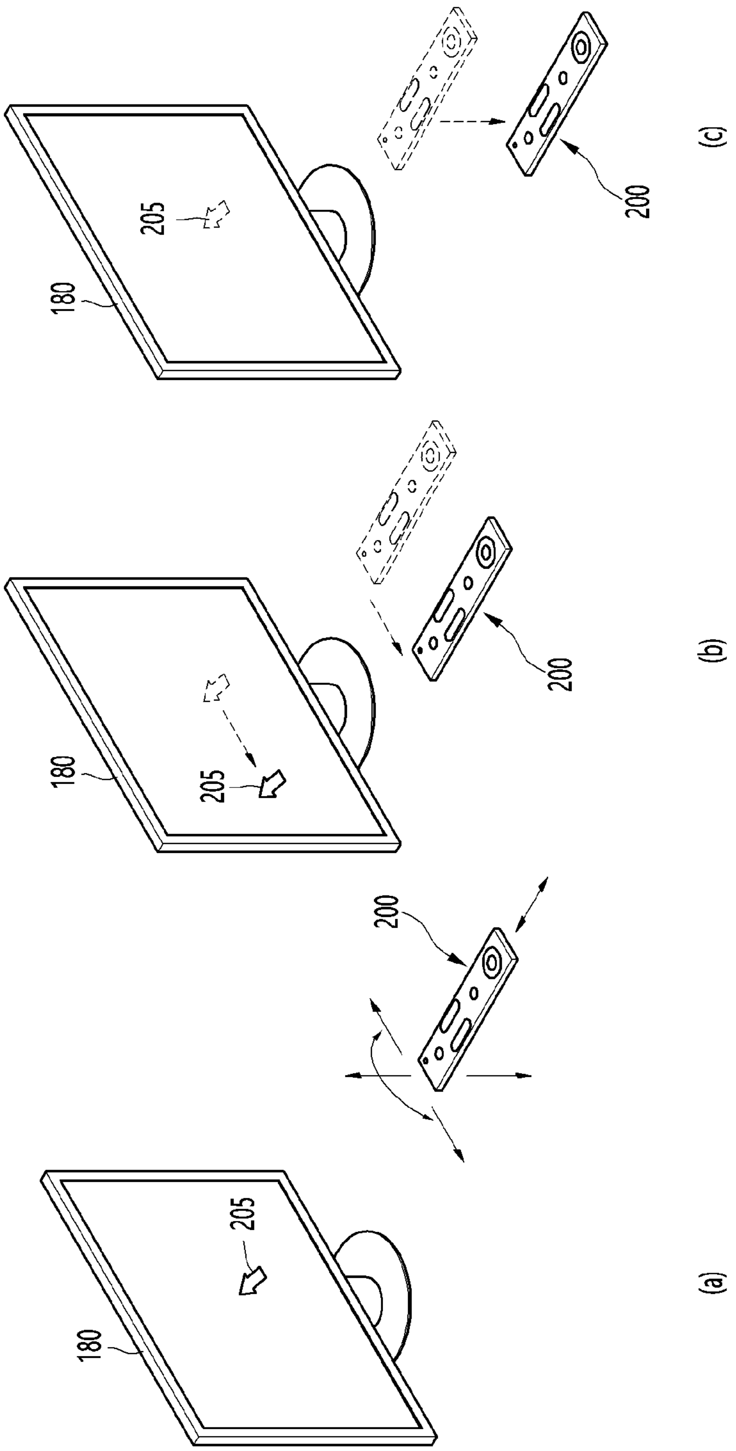
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Meanwhile, the control unit 170 may be referred to as a processor 170. The wireless communication unit 173 may be referred to as a communication interface 173. Also, the storage unit 140 may be referred to as a memory 140.

Figure 5:
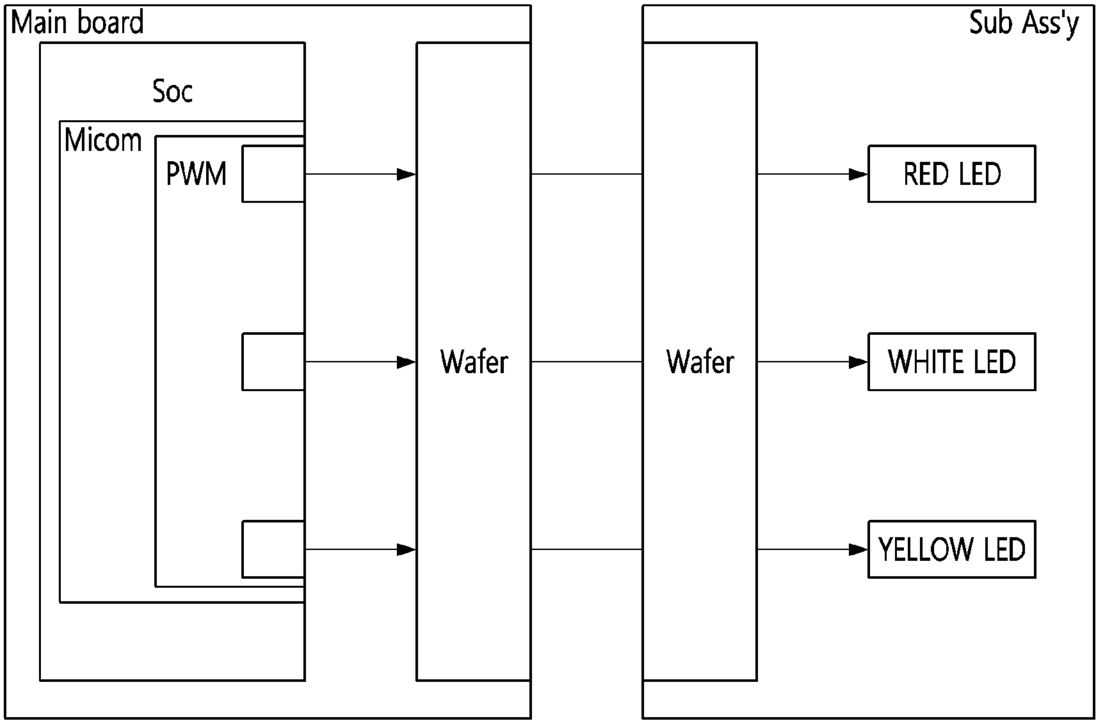
FIG. 5 is a block diagram for describing increase in cost due to addition of a plurality of LED modules.

FIG. 5 is a block diagram for describing increase in cost due to addition of a plurality of LED modules.

Referring to FIG. 5, when a plurality of LED modules RED LED, WHITE LED and YELLOW LED are added to a sub-assembly, it is necessary to add as many cables as the number of the plurality of LED modules to transmit a signal for controlling each of the plurality of LED modules, and in particular, secure as many ports of a PWM generator as the number of LED modules. In this case, a problem arises in that cost increases by the number of added LED modules.

Figure 6:
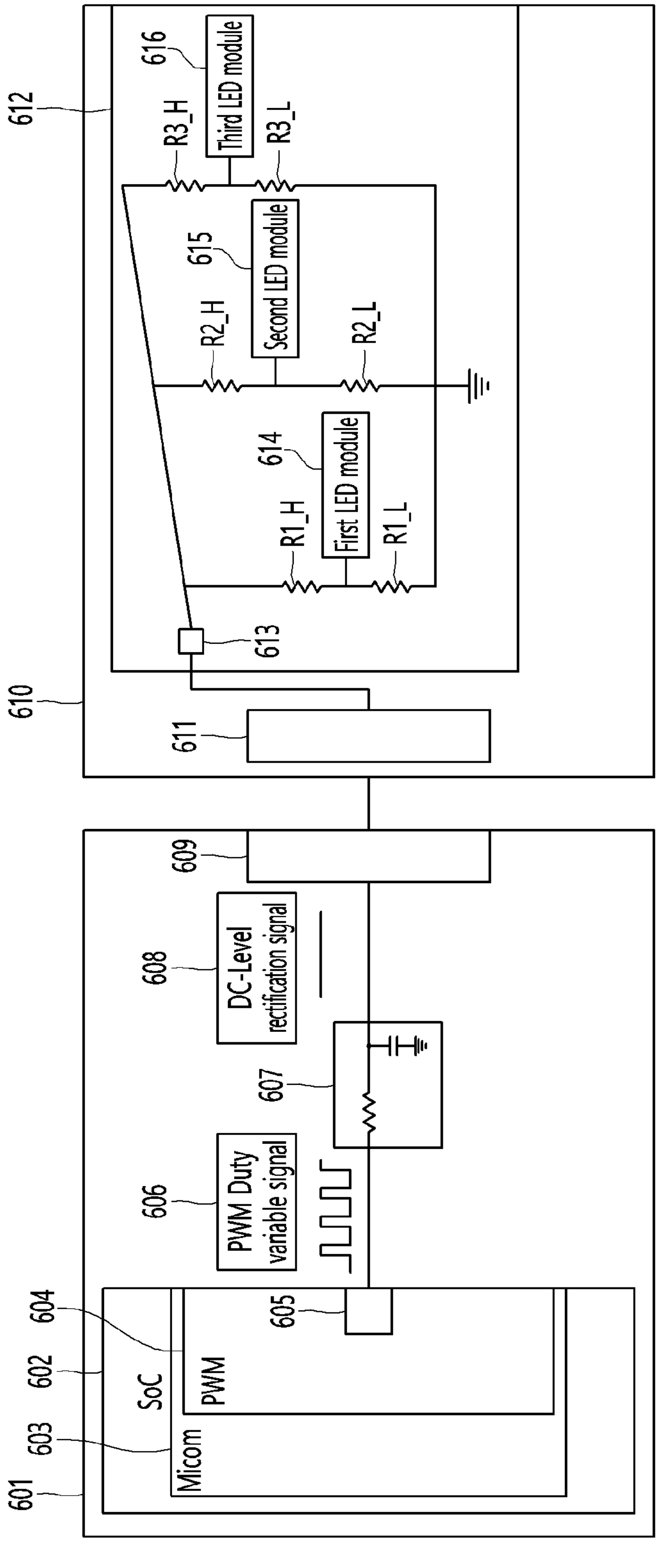
FIG. 6 is a block diagram for describing a display device including an LED circuit according to an embodiment of the present disclosure.

FIG. 6 is a block diagram for describing a display device including an LED circuit according to an embodiment of the present disclosure.

The display device 100 may include a main board 601. The main board is also called a motherboard because it is responsible for connecting various devices into one, and the main board fixes or connects various devices (processors, etc.) and provides a path for transferring data. Furthermore, depending on the performance of the main board, the types of available CPUs, the types and number of connectable devices, and the like may be determined.

Meanwhile, the main board 601 may include a System on Chip (Soc) 602. The system on chip may be a single chip in which major semiconductor devices such as various computing devices (CPUs), memory devices (DRAM, flash, etc.), and digital signal processing devices (DSPs) are implemented.

Meanwhile, the system on chip 602 may include a microcomputer (Micom) 603. The processor 170 may include a general-purpose processor such as the microcomputer 603, and may perform various operations of the display device 100 by loading and executing a corresponding program into RAM according to a predetermined algorithm stored in ROM.

Meanwhile, the microcomputer 603 may include a pulse width modulation (PWM) signal generator 604.

The pulse width modulation (PWM) signal generator 604 may include an output port 605 capable of outputting a pulse width modulated signal.

The processor 170 may output a PWM duty variable signal 606 through the output port 605 by controlling the pulse width modulation (PWM) signal generator 604. The PWM duty variable signal 606 may be a square wave signal that maintains a voltage value that can be output at a high level for a certain duty period and outputs a low value for the rest. On the other hand, the PWM Duty variable signal 606 may be an AC signal for controlling the on or off of LED modules to be described later.

In addition, the PWM duty variable signal 606 may be input to a RC filter 607 and output as a DC-level rectification signal 608. The RC filter 607 may include a resistor element and a capacitor, and accordingly, the PWM duty variable signal 606 output from the pulse width modulation (PWM) signal generator 604 may be input to the RC filter 607 and output as the DC-level rectification signal 608.

Meanwhile, the display device 100 may include a sub-board 610 including an LED circuit 612 for controlling a plurality of LED modules.

A first wafer 608 of the main board 601 and a second wafer 611 of the sub-board 610 may be connected through a cable 610, so that the DC-level rectification signal 608 is input to the input terminal 613 of of the LED circuit 612. Meanwhile, the maximum voltage of the input rectification signal 608 may be 3.3V and the minimum voltage may be 0V.

On the other hand, the LED circuit 612 may include the input terminal 613 for receiving the rectification signal 608. In addition, the LED circuit 612 may include a first resistor R1_H connected in parallel to the input terminal 613 and a second resistor R1_L connected in series to the first resistor R1_H. In addition, the LED circuit 612 may include a first LED module 614 connected to a junction point of the first resistor R1_H and the second resistor R1_L.

In addition, the LED circuit 612 may include a third resistor R2_H connected in parallel to the input terminal 613 and a fourth resistor R2_L connected in series to the third resistor R2_H. In addition, the LED circuit 612 may include a second LED module 615 connected to a junction point of the third resistor R2_H and the fourth resistor R2_L.

In addition, the LED circuit 612 may include a fifth resistor R3_H connected in parallel to the input terminal 613 and a sixth resistor R3_L connected in series to the fifth resistor R3_H. In addition, the LED circuit 612 may include a third LED module 616 connected to a junction point of the fifth resistor R3_H and the sixth resistor R3_L.

Meanwhile, the first LED module 614, the second LED module 615, and the third LED module 616 may be included in a lighting unit (not shown). The lighting unit (not shown) may be positioned on the outer surface of the display device 100 to emit light of various colors.

Meanwhile, the first LED module 614, the second LED module 615, and the third LED module 616 may include LEDs that emit light of different colors. For example, the first LED module 614 may include an LED emitting red light, the second LED module 615 may include an LED emitting green light, and the third LED module 616 may include an LED emitting blue light.

Accordingly, the lighting unit may emit light of a plurality of colors according to whether each of the first LED module 614, the second LED module 615, and the third LED module 616 is turned on or off. For example, when all of the first LED module 614, the second LED module 615, and the third LED module 616 are turned on, the lighting unit may emit white light. Further, for example, when the first LED module 614 and the second LED module 615 are turned on (ON) and the third LED module 616 is turned off (OFF), the lighting unit may emit yellow light. Further, for example, when the first LED module 614 is turned on (ON) and the second LED module 615 and the third LED module 616 are turned off (OFF), the lighting unit may emit red light.

Meanwhile, the first LED module 614, the second LED module 615, and the third LED module 616 may have different reference voltages at which they are turned on.

For example, the first LED module 614 may have a first reference voltage at which the first LED module 614 is turned on when a voltage of 1.0V or more is input. In addition, the second LED module 615 may have a second reference voltage at which the second LED module 615 is turned on when a voltage of 1.8V or more is input. In addition, the third LED module 616 may have a third reference voltage at which the third LED module 616 is turned on when a voltage of 2.8V or more is input.

Therefore, the intensity of a voltage input to each of the plurality of LED modules may vary according to the voltage intensity of the rectification signal 608 input to the input terminal 613 of the LED circuit 612 and the resistance value of each of the plurality of resistors.

Accordingly, the processor 170 may control the on or off of each of the plurality of LED modules in such a way to adjust the voltage intensity of the rectification signal 608 input to the input terminal 613 by adjusting the duty cycle of the AC signal 606 output from the pulse width modulation signal generator 614.

Meanwhile, the first resistor R1_H, the second resistor R1_L, the third resistor R2_H, the fourth resistor R2_L, the fifth resistor R3_H, and the sixth resistor R3_L may have different resistance values to turn on or off each of the plurality of LED modules 614, 615, and 616 according to the voltage intensity of the rectification signal 608. That is, the intensity of a voltage input to each LED module may vary such that each LED module is turned on or off based on the voltage intensity of one rectification signal 608. Accordingly, the on or off of each of the first LED module 614, the second LED module 615, and the third LED module 616 having different reference voltages may be controlled by one rectification signal 608.

For example, the resistance values of each of the first resistor R1_H, the second resistor R1_L, the third resistor R2_H, the fourth resistor R2_L, the fifth resistor R3_H, and the sixth resistor R3_L may have the following relationship:

$$R1_L/(R1_H+R1_L)>R2_L/(R2_H+R2_L)>R3_L/(R3_H+R3_L) \quad \text{[Equation 1]}$$

$$R1_H+R1_L \approx R2_H+R2_L \approx R3_H+R3_L \quad \text{[Equation 2]}$$

On the other hand, when the voltage value of the rectification signal 608 input to the input terminal 613 is V0, a voltage V1 input to the first LED module 614 and a voltage V2 input to the second LED module 615 and a voltage V3 input to the third LED module 616 are as follows.

$$V1=V0*R1_L/(R1_H+R1_L)$$

$$V2=V0*R2_L/(R2_H+R2_L)$$

$$V3=V0*R3_L/(R3_H+R3_L) \quad \text{[Equation 3]}$$

Meanwhile, according to an embodiment, when the resistance value of the first resistor is 1000Ω, the resistance value of the second resistor is 3500Ω, the resistance value of the third resistor is 2700Ω, the resistance value of the fourth resistor is 1800Ω, and the resistance value of the fifth resistor is 3300Ω, the resistance value of the sixth resistor is 1200Ω, the reference voltage of the first LED module 614 is 1.0V, the reference voltage of the second LED module 615 is 1.8V, and the reference voltage of the third LED module 616 is 2.8V, each LED module may be turned on or off according to the voltage value of the rectification signal 608 input to the input terminal 613 as shown in the following table.

TABLE 1

| | Input Voltage Value | | |
|---|---|---|---|
| | 3.3 V | 2.3 V | 1.3 V |
| Third LED module - Blue | ON | OFF | OFF |
| Second LED module - Green | ON | ON | OFF |
| First LED module - Red | ON | ON | ON |
| Emission color | White | Yellow | Red |

Accordingly, the processor 170 may control the on or off of each of the plurality of LED modules in such a way to adjust the voltage intensity of the rectification signal 608 input to the input terminal 613 by adjusting the duty cycle of the AC signal 606 output from the pulse width modulation signal generator 614.

For example, when the voltage intensity of the rectification signal 608 has 0V at a minimum in a maximum of 3.3V, the processor 170 sets the duty ratio of the AC signal 606 output from the PWM generator 604 to 39%. By adjusting, only the first LED module 616 can be controlled to be turned on.

Figure 7:
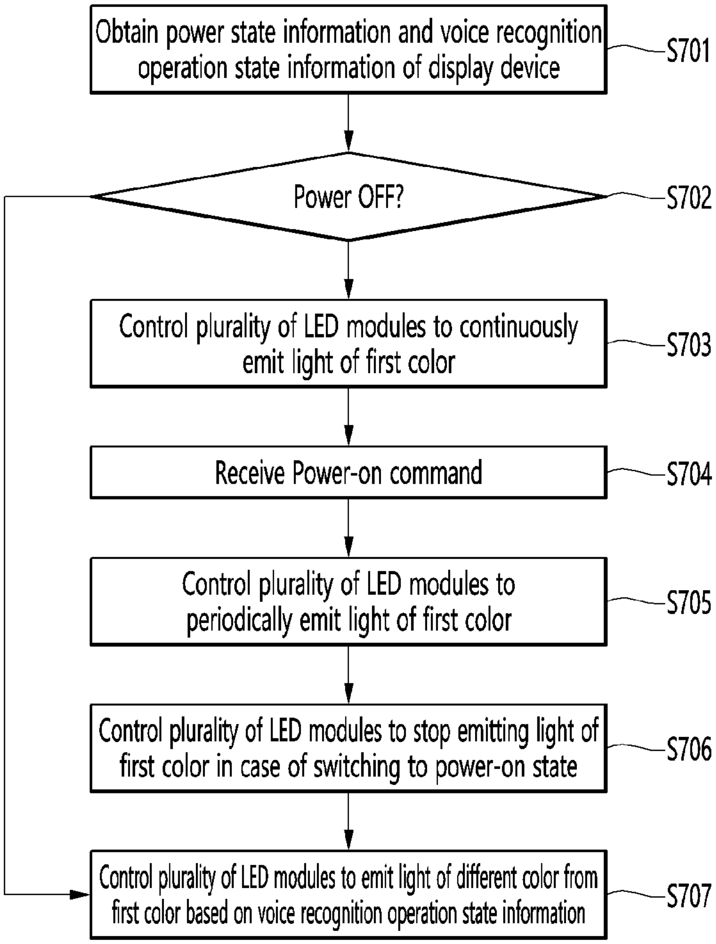
FIG. 7 is a flowchart for describing a method of controlling LED emission according to an operation state of a display device according to an embodiment of the present disclosure.

FIG. 7 is a flowchart for describing a method of controlling LED emission according to an operation state of a display device according to an embodiment of the present disclosure. On the other hand, with reference to the embodiment of Table 1, a method of controlling LED emission will be described.

The processor 170 may obtain power state information and voice recognition operation state information of the display device 100 (S701).

The processor 170 may obtain power state information about whether the power of the display device 100 is turned on or off.

Meanwhile, a plurality of voice recognition services may operate in the display device 100. For example, the processor 170 may selectively operate a first voice recognition service of a first voice recognition service provider and a second voice recognition service of a second voice recognition service provider.

The processor 170 may obtain voice recognition operation state information of the display device 100. The voice recognition operation state information may include identification information for each of a plurality of voice recognition services, information on whether the voice recognition service is operating, information specifying a voice recognition service in operation, information on whether or not the voice recognition service in operation has entered a voice recognition standby mode in which the voice recognition service in operation is waiting to receive a wake-up word, and information on whether the voice recognition service in operation has received a wake-up word and switched to a voice recognition execution mode in which the voice recognition service in operation is waiting to receive a user's command.

Meanwhile, the processor 170 may determine whether the power of the display device 100 is turned on or off (S702).

The processor 170 may control on or off of each of the plurality of LED modules such that the lighting unit continuously emits light of a first color when the power of the display device 100 is turned off based on the obtained power state information (S703). Accordingly, the user is able to intuitively recognize that the power of the display device 100 is in an off state.

For example, when the first color is red, the processor 170 may perform control such that only the first LED module 616 including a red LED is turned on, by adjusting the duty ratio of an AC signal 606 output from the PWM generator 604 to 39% and outputting the continuous AC signal 606.

Meanwhile, the processor 170 may receive a power-on command for turning on the power of the display device 100 (S704).

The processor 170 may turn on the power of the display device 100 in response to the power-on command for turning on the power of the display device 100, and it may take a predetermined amount of time for the display device 100 to be turned on.

Meanwhile, the processor 170 may control on or off of each of the plurality of LED modules to periodically emit light of the first color while the power of the display device 100 is turned on (S705).

For example, when the first color is red, the processor 170 may perform control such that only the first LED module 616 including the red LED is turned on or off, by repeatedly adjusting the duty ratio of the AC signal 606 output from the PWM generator 604 to 39% or 0% at a predetermined time period (e.g., 0.5 second).

Meanwhile, when the display device 100 is switched to a power-on state, the processor 170 may perform control such that each of the plurality of LED modules is turned off to stop emitting light of the first color (S706).

For example, when the display device 100 is switched to a power-on state, the processor 170 may perform control such that all LED modules are turned off by adjusting the duty ratio of the AC signal 606 output from the PWM generator 604 to 0%.

Meanwhile, the processor 170 may determine whether the power of the display device 100 is in an on state based on the power state information, and when it is determined that the power of the display device 100 is in an on state, control on or off of each of the plurality of LED modules to emit light of a color different from the first color according to the voice recognition operation state information (S707).

When the processor 170 determines that the first voice recognition service of a first voice recognition service provider is operating in the display device 100 based on the voice recognition operation state information, the processor 170 may control on or off of each of the plurality of LED modules such that light of a second color indicating the operation state of the first voice recognition service is emitted from the lighting unit.

In addition, when the processor 170 determines that the second voice recognition service of a second voice recognition service provider is operating in the display device 100 based on the voice recognition operation state information, the processor 170 may control on or off of each of the plurality of LED modules such that light of a third color indicating the operation state of the second voice recognition service is emitted from the lighting unit.

Figure 8:
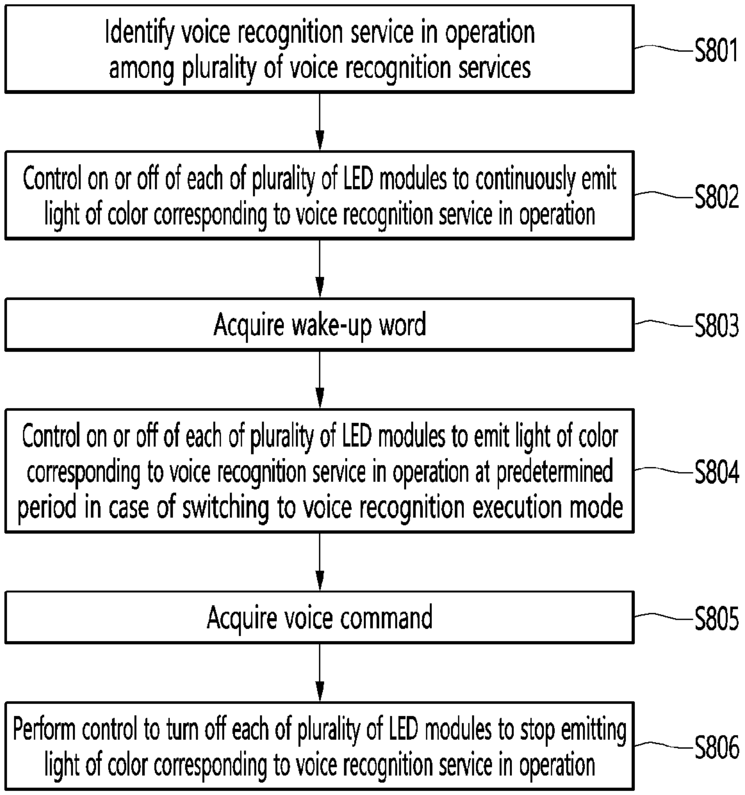
FIG. 8 is a flowchart for describing a method of controlling LED emission according to an operation state of a display device according to an embodiment of the present disclosure.

FIG. 8 is a flowchart for describing a method of controlling LED emission according to a voice recognition operation state according to an embodiment of the present disclosure.

The processor 170 may determine a voice recognition service in operation among a plurality of voice recognition services operable in the display device 100 based on the voice recognition operation state information (S801).

For example, a first voice recognition service and a second voice recognition service may be operable in the display device 100, and a voice recognition service currently operating in the display device 100 may be the first voice recognition service. In this case, wake-up words of the first voice recognition service and the second voice recognition service may be different from each other. Accordingly, when an LED of a color capable of notifying that the first voice recognition service is in operation is emitted through the lighting unit of the display device 100, it is possible to allow a user to recognize which wake-up word to utter.

When the voice recognition service in operation enters a voice recognition standby mode, the processor 170 may control on or off of each of the plurality of LED modules such that light of a color corresponding to the voice recognition service in operation continuously is emitted (S802).

For example, the processor 170 may control on or off of each of the plurality of LED modules such that a second color indicating an operation state of the first voice recognition service in operation is emitted from the lighting unit.

When the second color is yellow, the processor 170 may perform control such that a first LED module 616 including a red LED and a second LED module 617 including a green LED are turned on by adjusting the duty ratio of an AC signal 606 output from the PWM generator 604 to 69% and outputting the continuous AC signal 606. Therefore, the user may identify the voice recognition service which has currently entered the voice recognition standby mode through the color of light continuously emitted from the lighting unit of the display device 100 and utter a correct wake-up word.

In addition, the processor 170 may acquire a wake-up word for switching from the voice recognition standby mode to a voice recognition execution mode (S803). For example, the processor 170 may determine whether the user's voice acquired through a voice acquisition unit 175 matches the wake-up word, and when the user's voice corresponds to the wake-up word, switch the voice recognition service in operation to the voice recognition execution mode. The voice recognition execution mode may be a mode in which a voice command is received from a user and an operation corresponding to the voice command is executed.

Meanwhile, the processor 170 may control on or off of each of the plurality of LED modules such that light of a color corresponding to the voice recognition service in operation is emitted at predetermined periods (S804).

For example, the processor 170 may control on or off of each of the plurality of LED modules such that light of a second color is periodically emitted from the lighting unit to indicate that the first voice recognition service in operation has been switched to the voice recognition execution mode by a wake-up word.

When the second color is yellow, the processor 170 may perform control such that the first LED module 616 including the red LED and the second LED module 617 including the green LED is turned on or off, by repeatedly adjusting the duty ratio of the AC signal 606 output from the PWM generator 604 to 69% or 0% at a predetermined time period (e.g., 0.5 second).

Therefore, the user may identify that the voice recognition service in operation has been switched to the voice recognition execution mode with the color of light periodically emitted from the lighting unit of the display device 100 and utter a predetermined voice command.

Meanwhile, the processor 170 may obtain a predetermined voice command in the voice recognition execution mode (S805). The processor 170 may perform an operation corresponding to the obtained predetermined voice command. The predetermined voice command may also include commands requiring a specific operation, such as "change channel".

Meanwhile, when a predetermined voice command is obtained in the voice recognition execution mode, the processor 170 may perform control to turn off each of the plurality of LED modules to stop emitting light of a color corresponding to a voice recognition service in operation (S806).

The processor 170 may perform control to turn off all LED modules by adjusting the duty ratio of the AC signal 606 output from the PWM generator 604 to 0%.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment.

The scope of protection of the present disclosure should be interpreted by the following claims, and all technical ideas within the scope equivalent thereto should be construed as being included in the scope of the present disclosure.

INDUSTRIAL APPLICABILITY

According to the display device according to the present disclosure, a user can intuitively grasp the operation state of the display device by allowing LEDs of various colors to emit light according to the operation state of the display device, thus achieving remarkable industrial applicability.

The invention claimed is:

1. A display device comprising:

a lighting unit including a plurality of light emitting diode (LED) modules;

a pulse width modulation signal generator configured to output an alternating-current signal for controlling an on or off state of each of the plurality of LED modules;

a resistor-capacitor (RC) filter configured to convert the alternating-current signal into a rectification signal;

an LED circuit configured to turn on or off each of the plurality of LED modules according to a voltage intensity of the rectification signal; and a processor configured to control the on or off state of each of the plurality of LED modules by adjusting a duty ratio of the alternating-current signal output from the pulse width modulation signal generator based on operation state information of the display device, wherein the processor is configured to obtain power state information and voice recognition operation state information of the display device and control the on or off state of each of the plurality of LED modules based on the power state information and voice recognition operation state information.

2. The display device of claim 1, wherein the LED circuit includes:

an input terminal configured to receive the rectification signal;

a first resistor connected in parallel with the input terminal;

a second resistor connected in series with the first resistor;

a first LED module connected to a connection point of the first resistor and the second resistor;

a third resistor connected in parallel with the input terminal;

a fourth resistor connected in series with the third resistor;

a second LED module connected to a connection point between the third resistor and the fourth resistor;

a fifth resistor connected in parallel with the input terminal;

a sixth resistor connected in series with the fifth resistor; and a third LED module connected to a connection point between the fifth resistor and the sixth resistor.

3. The display device of claim 2, wherein a first reference voltage for turning on the first LED module, a second reference voltage for turning on the second LED module, and a third reference voltage for turning on the third LED module each have different values.

4. The display device of claim 3, wherein the first resistor, the second resistor, the third resistor, the fourth resistor, the fifth resistor, and the sixth resistor each have different resistance values to respectively turn on or off the plurality of LED modules according to a voltage strength of the rectification signal.

5. The display device of claim 2, wherein the first LED module includes a red LED, the second LED module includes a green LED, and the third LED module includes a blue LED.

6. The display device of claim 5, wherein the lighting unit emits light of a plurality of colors according to the on or off state of each of the first LED module, the second LED module, and the third LED module.

7. The display device of claim 1, wherein the processor is configured to control the on or off state of each of the plurality of LED modules such that the lighting unit continuously emits light of a first color indicating a power off state when it is determined that power of the display device is in an off state, based on the power state information.

8. The display device of claim 7, wherein the processor is configured to receive a power-on command for turning on the power of the display device and control the on or off state of each of the plurality of LED modules to periodically emit light of the first color while the power of the display device is switched to an on state.

9. The display device of claim 8, wherein the processor is configured to perform control such that all of the plurality of LED modules are turned off to stop emitting light of the first color when the power of the display device is switched to the on state based on the power state information.

10. The display device of claim 7, wherein the processor is configured to control the on or off o of each of the plurality of LED modules to emit light of a color different from the first color according to the voice recognition operation state information when it is determined that the power of the display device is in an on state, based on the power state information.

11. The display device of claim 10, wherein the processor is configured to specify a voice recognition service in operation among a plurality of voice recognition services based on the voice recognition operation state information.

12. The display device of claim 11, wherein the processor is configured to control the on or off state of each of the plurality of LED modules to emit light of a second color indicating the voice recognition service continuously emits light when the voice recognition service in operation enters a voice recognition standby mode.

13. The display device of claim 12, wherein the processor is configured to acquire a wake-up word that allows the voice recognition service in operation to switch from the voice recognition standby mode to a voice recognition execution mode and control the on or off of state each of the plurality of LED modules such that light of the second color indicating the voice recognition service in operation is emitted at a predetermined cycle when the voice recognition service in operation switches to the voice recognition execution mode.

14. The display device of claim 13, the processor is configured to perform control such that all of the plurality of LED modules are turned off to stop emitting light of the second color indicating the voice recognition service in operation when a predetermined voice command is obtained in the voice recognition execution mode.

* * * * *